(12) United States Patent
Mukherjee

(10) Patent No.: US 10,776,440 B2
(45) Date of Patent: Sep. 15, 2020

(54) QUERY INTERPOLATION IN COMPUTER TEXT INPUT

(71) Applicant: Microsoft Technology Licensing, LLC, Redmond, WA (US)

(72) Inventor: Kaustav Mukherjee, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 264 days.

(21) Appl. No.: 15/922,754

(22) Filed: Mar. 15, 2018

(65) Prior Publication Data
US 2019/0286749 A1    Sep. 19, 2019

(51) Int. Cl.
| | | |
|---|---|---|
| G06F 16/30 | (2019.01) | |
| G06F 16/9535 | (2019.01) | |
| G06F 16/242 | (2019.01) | |
| G06F 16/332 | (2019.01) | |
| G06F 16/957 | (2019.01) | |
| G06F 16/9032 | (2019.01) | |
| G06F 16/9538 | (2019.01) | |
| G06F 40/134 | (2020.01) | |
| G06F 40/279 | (2020.01) | |

(52) U.S. Cl.
CPC ...... *G06F 16/9535* (2019.01); *G06F 16/2433* (2019.01); *G06F 16/3322* (2019.01); *G06F 16/90332* (2019.01); *G06F 16/9538* (2019.01); *G06F 16/9577* (2019.01); *G06F 40/134* (2020.01); *G06F 40/279* (2020.01)

(58) Field of Classification Search
CPC .................. G06F 16/90332; G06F 40/134
See application file for complete search history.

(56) References Cited

U.S. PATENT DOCUMENTS

| | | | |
|---|---|---|---|
| 7,363,295 B2 | 4/2008 | Szeto et al. | |
| 2011/0099464 A1* | 4/2011 | Marashi | G06Q 10/107 715/208 |
| 2014/0173460 A1* | 6/2014 | Kim | G06T 11/60 715/753 |

(Continued)

OTHER PUBLICATIONS

"Project Entity Linking," retrieved from https://www.microsoft.com/cognitive-services/en-us/entity-linking-intelligence-service, retrieved on Feb. 16, 2018, 2 pages.

(Continued)

*Primary Examiner* — Mahesh H Dwivedi
(74) *Attorney, Agent, or Firm* — Ray Quinney & Nebeker P.C; James Bullough

(57) ABSTRACT

Techniques are described for interpreting selected portions of a user's computer text input as a query for data, performing a web search responsive to the query to generate query results, and interpolating the query results into the existing text input without the user having to leave the application in which the text input was entered. For example, textual delimiters may be defined for use by a given application that—when inserted into a text box—signal a query that the user wishes to have performed. For example, the delimiters and the associated text may be used to trigger a given query, and once the query has been performed, the delimiters and associated text may be replaced by the query results without the user ever having to leave the program or make a separate entry outside the text box in which the user is working when the query is generated.

20 Claims, 9 Drawing Sheets

(56) References Cited

U.S. PATENT DOCUMENTS

| | | | |
|---|---|---|---|
| 2016/0006856 A1* | 1/2016 | Bruno | G06F 16/951 |
| | | | 715/809 |
| 2016/0034977 A1* | 2/2016 | Bhaowal | G06F 16/951 |
| | | | 707/722 |
| 2019/0213207 A1* | 7/2019 | Lisa | G06F 16/338 |

OTHER PUBLICATIONS

"5$^{th}$ Test, India tour of Australia at Perth," retrieved from http://www.espncricinfo.com/ci/engine/current/match/63567.html, Feb. 1, 1992, 4 pages.

John, "Sourav Ganguly 144 Brisbane v. AUS 2013," retrieved from https:///www.youtube.com/watch?v=Qvca6v55t54, Apr. 7, 2011, 3 pages.

"International Search Report and Written Opinion Issued in PCT Application No. PCT/US2019/021251", dated May 16, 2019, 12 Pages.

\* cited by examiner

FIG. 1

I went to {{places I visited in Spain in 2017}} last year. — 110

I went to Madrid, Barcelona, Seville, Majorca, Tenerife and Granada last year. — 120

Hey have you seen this image? {{Che Guevara famous photo URL}}
— 510

Hey have you seen this image? https://upload.wikimedia.org/wikipedia/commons/thumb/5/58/CheHigh.jpg/225px-CheHigh.jpg
— 520

Hey have you seen wikipedia/commo CheHigh.jpg
— 530 rg/

— 550

Close
560

— 540

QUERY INTERPOLATION IN COMPUTER TEXT INPUT

BACKGROUND

Queries, such as Structured Query Language (SQL) queries can be a powerful tool for obtaining information. However, such queries cannot presently be performed and their results returned in computer input fields which are designated for text entry. For example, often a user may be typing text in a text-input field (in HTML parlance—a<textarea> or a <input type="text" I>, when a situation arises in which additional information is required in order to complete the text entry. For example, a user may be responding to an instant message from another user who asks: "Which places in Spain did you visit last year?" In preparing a response, the user must either try to recall the places in Spain that the user visited by memory, or perform a separate search of information—perhaps information stored elsewhere on the user's computer—before responding with, "Last year in Spain I visited Seville, Mallorca, Barcelona, Madrid, Malaga, Marbella, Granada and Cordoba."

So, even if the user is able to recall the places specifically, completing this text entry takes a considerable amount of typing and memory. And, if the user does not recall the answer to her friend's question, she will be forced to leave the text-input field, and likely leave the instant messaging application altogether to perform a separate search. Then, any such search results are likely to be returned in a fashion which may not readily lend itself to the text input window, or which at a minimum must undergo several additional operations to return them to the text-input field in which the user desires to include the information reflecting the search results in her text response.

Therefore, there exists an opportunity to improve technologies for interpreting selected portions of a user's computer text input as a query for data, performing a web or other search responsive to the query to generate query results, and interpolating the query results into the existing text input without the user having to leave the application in which the text input was entered.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for interpolating query results into computer text input using textual delimiters.

For example, a computer-readable storage medium may be provided for storing computer-executable instructions for execution on a computing device to perform operations for interpolating queries into computer text input. The operations may comprise: receiving computer text input from a user, the computer text input comprising: a first portion of the computer text input that begins with a first delimiter and ends with a second delimiter and further comprises additional computer text input between the first and second delimiters, wherein the first portion represents a natural language query, and a second portion of the computer text input that is outside of the first and second delimiters. The operations may further comprise interpreting the first portion of the computer text input into a query, and running the query across one or more data stores and receiving a query result. The operations may also comprise determining whether the query result comprises a non-text resource, and when the query result comprises a non-text resource, generating a link to the non-text resource. The operations may also comprise interpolating the query result into a display of the computer text input to replace the first portion of the computer text input, wherein interpolating the query results comprises: deleting the first portion of the computer text input, wherein the second portion of the computer text input is not deleted, and replacing the deleted computer text input with the query result, wherein when the query result comprises a non-text resource: the replacing comprises inserting the link to the non-text resource, and the non-text resource itself is not included in the replaced computer text input.

As another example, a computer-implemented method may be provided for interpolating a query into computer text input. The method may comprise receiving computer text input from a user comprising one or more textual delimiters, interpreting the computer text input into a query, running the query across one or more data stores and receiving a query result, and interpolating the query result into a display of the computer text input to replace one or more portions of the computer text input that are associated with the one or more textual delimiters.

As another example, computing devices comprising processing units and memory may be provided for performing the operations described herein. For example, a computing device may receive computer text input from a user comprising one or more textual delimiters. The computing device may further interpret the computer text input into a query, run the query across one or more data stores and receiving a query result, and interpolate the query result into a display of the computer text input to replace one or more portions of the computer text input that are associated with the one or more textual delimiters.

As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 1 is an example of computer text input boxes before and after a query is interpolated into the computer text input.

DETAILED DESCRIPTION

Overview

Figure 2:
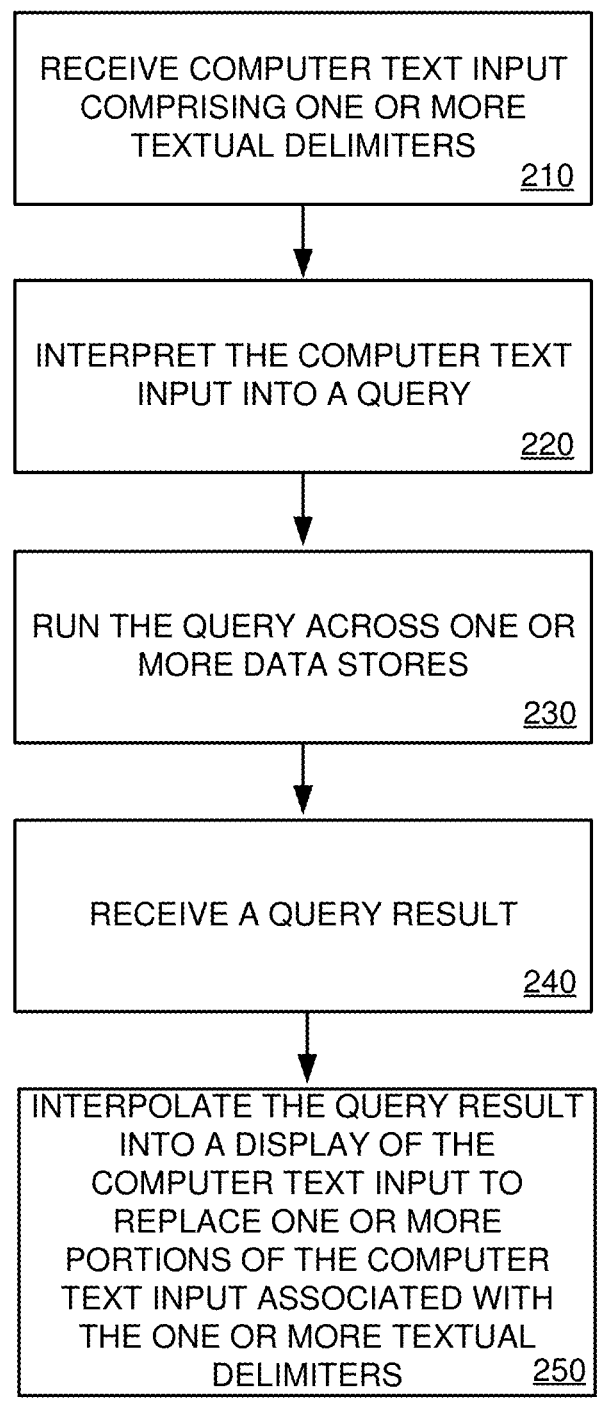
FIG. 2 is a flowchart of an example method for interpolating a query in computer text input.

As described herein, various techniques and solutions can be applied for interpreting selected portions of a user's computer text input as a query for data, performing a web search responsive to the query to generate query results, and interpolating the query results into the existing text input without the user having to leave the application in which the text input was entered.

In one example, a user may be writing a scholastic article on cricket player Sachin Tendulkar, outlining how occasions when he scored 100 or more runs (referred to as "centuries") in Australia came amidst tough conditions—when his teammates were regularly failing to score runs. In preparing the article, the user might like to include the links to one or more webpages that contain scorecards to those matches. Of course, the user likely has not memorized the addresses to the webpages, sometimes referred to as Uniform Resource Locators (or "URL"s), and so might be required to perform a search on a computer search engine, such as Bing® or Google®, with the search reading, perhaps: "Sachin Tendulkar centuries in Australia". Depending on the exact search, the user may get a page with a list of all matches in which Sachin Tendulkar notched "centuries," with hyperlinks to one or more pages containing the scorecards. At that point, using conventional methods, the user would have to go to each webpage, copy the links to the centuries of interest, and paste them back into the original text field in the respective tab. Or, perhaps the user may search more extensively to find the URLs of the individual webpages containing the scorecards, and paste each of them into the text-field. Either exercise requires a great deal of effort for the user. She must: 1. Leave the current tab to go to another tab. 2. Search for the key-phrase and browse through results. 3. Shuttle back—often multiple times—between original tab and new tabs to copy the various links and paste them. That is lot of effort for the user.

This disclosure sets forth computer-implemented methods and apparatus for simplifying the interpolation of such a query or queries directly into the computer text input box, without the user ever having to leave the application in which the computer text input is being received.

For example, textual delimiters may be defined for use by a given application that—when inserted into a text box—signal a query that the user wishes to have performed. For example, the delimiters and the associated text may be used to trigger a given query, and once the query has been performed, the delimiters and associated text may be replaced by the results of the query without the user ever having to leave the program or make a separate entry outside the text box in which the user is working when the query is generated.

FIG. 1 sets forth an example of how a user's query for data can be input directly into a text input area, and the results interpolated directly into the text where the query was entered. In the illustrated example 100, the user types: "I went to {{places I visited in Spain in 2017}} last year" in a first text box 110. In the illustrated embodiment, the portion of this phrase {{places I visited in Spain in 2017}} might be interpreted as a query, which in turn may run against the data stored in the user's computer, and return the results "Madrid, Barcelona, Seville, Majorca, Tenerife and Granada." In turn, these query results are "interpolated" into the original text box, replacing "{{places I visited in Spain in 2017}}" with "Madrid, Barcelona, Seville, Majorca, Tenerife and Granada." Thus, performing the interpolation results in the phrase shown in text box 120, namely "I went to Madrid, Barcelona, Seville, Majorca, Tenerife and Granada last year."

FIG. 2 is a flowchart of an example method 200 for performing query interpolation. The example method 200 can be performed, at least in part, by a computing device.

At 210, computer text input is received. The computer text input comprises one or more textual delimiters and associated text. Additionally, text may be included in the computer text input that is not associated with the one or more textual delimiters. The computer text input may be, for example, computer text that is entered in a text box in a given application, such as a word processing program, an instant messaging application, an email, or the like. The methods of this disclosure may be used with any application in which computer text input is received.

At 220, the computer text input is interpreted into a query. For example, the one or more textual delimiters and the associated text may be passed to a backend system which is capable of parsing the text into one or more queries.

At 230, the query is run against one or more data stores. These data stores may be, for example, data stored on the user's computer, or they may include relational databases containing data which may be used to response to the query, as further described herein.

At 240, the result of the query is received. This result may be a textual result, or (as further described herein) it may be a non-textual result, such as, for example, a webpage, an image, or a video.

At 250, the query result is interpolated into a display of the computer text input. For example, the query results may replace one or more portions of the computer text input, such as the one or more textual delimiters and any associated computer text input.

Figure 3:
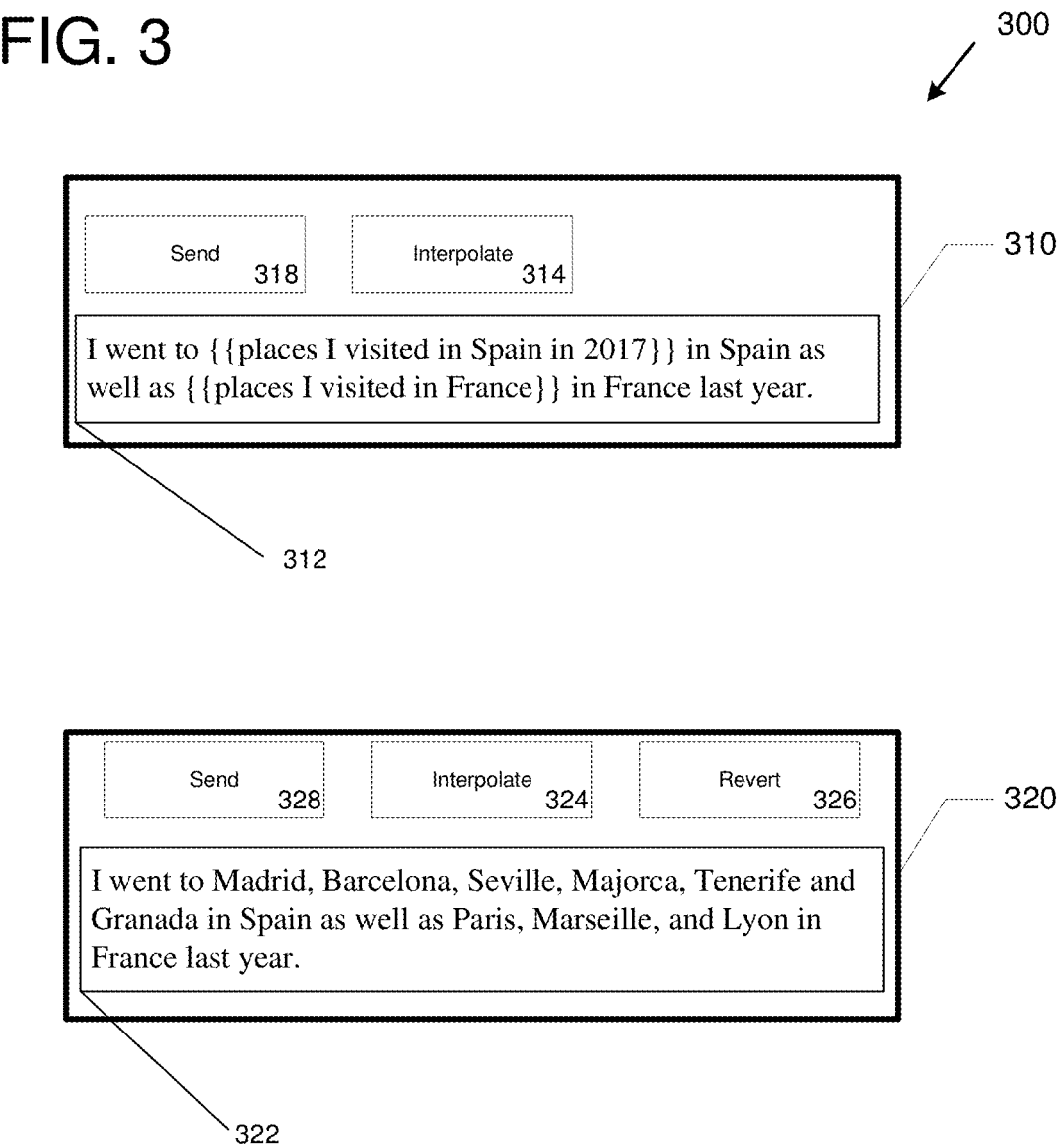
FIG. 3 is another example of computer text input boxes before and after multiple queries are interpolated into the computer text input.

FIG. 3 sets forth another example of how a user's query for data can be input directly into a text input area, and the results interpolated directly into the text where the query was entered. In the illustrated example 300, the user types: "I went to {{places I visited in Spain in 2017}} in Spain as well as {{places I visited in France}} in France last year." within a given application window 310, which includes a first computer text entry box 312. In the illustrated embodiment, the portion of this phrase {{places I visited in Spain in 2017}} might be interpreted as a first query, while {{places I visited in France}} may be interpreted as a second query. These two queries, in turn may run against the data stored in the user's computer, and return the results "Madrid, Barcelona, Seville, Majorca, Tenerife and Granada" and "Paris, Marseille, and Lyon", respectively. In turn, these two query results are each "interpolated" into the original text box at the appropriate location: "Madrid, Barcelona, Seville, Majorca, Tenerife and Granada", replaces "{{places I visited in Spain in 2017}}" and "Paris, Marseille, and Lyon" replaces "{{places I visited in France}}." Thus, performing the interpolation results in the phrase shown in the second text box 322, shown in second application window 320, namely: "I went to Madrid, Barcelona, Seville, Majorca, Tenerife and Granada in Spain as well as Paris, Marseille, and Lyon in France last year."

FIG. 3 also illustrates some additional functionality that may be provided for use with the methods of this disclosure.

First, within application window 310, there are two buttons in addition to text box 312. While buttons are illustrated, it is to be understood that these buttons could instead by replaced by icons, a selection menu, or other appropriate prompts providing the ability to receive user input. Interpolate button 314 provides the user the ability to parse the contents of the text box into one or more queries, run the queries across one or more data stores, receive one or more query results, and interpolate these results back into the computer text entered in text box 312. Send button 318 provides the user the ability to send the contents of text box 312.

Second, within application window 320, there are three buttons in addition to text box 322. Again, while buttons are illustrated, it is to be understood that these buttons could instead by replaced by icons, a selection menu, or other appropriate prompts providing the ability to receive user input. In addition to Interpolate button 324 and Send button 328, which may function similarly to the similar buttons described above, a third button is provided. Revert button 326 provides the user to revert back to the original text entered prior to interpolation after an interpolation operation has been completed. In this way, if the user is dissatisfied with the results of the query, she can return to where she was before the interpolation took place and, for example, enter a different query.

Figure 4:
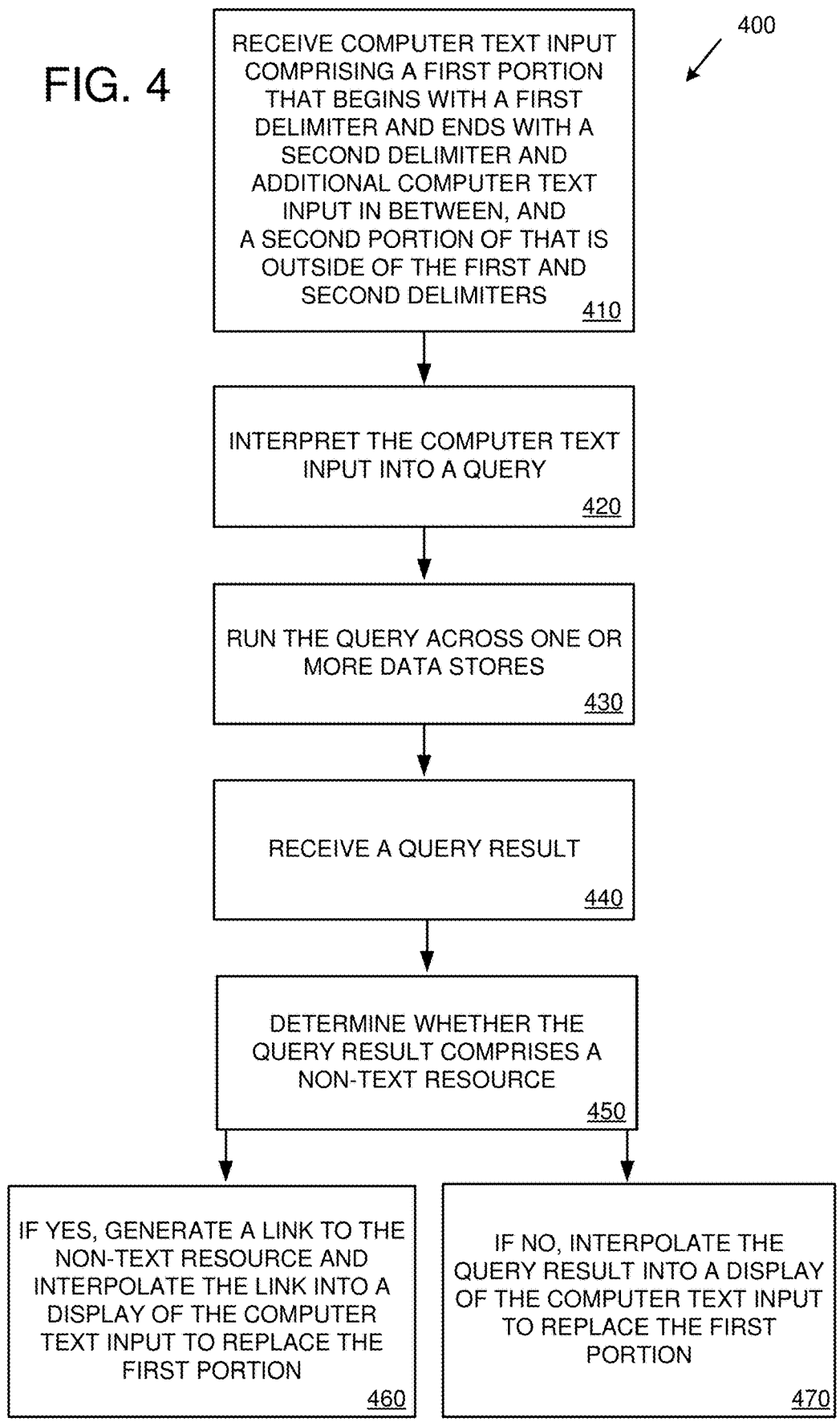
FIG. 4 is a flowchart of another example method for interpolating a query in computer text input.

FIG. 4 is a flowchart of another example method 400 for performing query interpolation. The example method 400 can be performed, at least in part, by a computing device.

At 410, computer text input comprising a first portion that begins with a first delimiter and ends with a second delimiter, along with additional computer text input in between the first and second delimiters, is received. Also at 410, a second portion of additional text that is outside of the first and second delimiters is received. The computer text input may be, for example, computer text that is entered in a text box in a given application, such as a word processing program, an instant messaging application, an email, or the like. The methods of this disclosure may be used with any application in which computer text input is received.

At 420, the computer text input is interpreted into a query. For example, the one or more textual delimiters and the associated text may be passed to a backend system which is capable of parsing the text into one or more queries. In some instances, these queries may be broken down into sub-queries that are configured to run against one or more relational databases, or other data stores, as may be described further herein.

At 430, the query (or queries) is run against one or more data stores. These data stores may be, for example, data stored on the user's computer, or they may include relational databases containing data which may be used to response to the query, as further described herein.

At 440, the result of the query (or queries) is received. This result may be a textual result, or (as further described herein) it may be a non-textual result, such as, for example, a webpage, an image, or a video.

At 450, it is determined whether the query result is computer text input, or a non-text resource. An example of a non-text resource might be a URL—with or without an associated hyperlink—designating a website containing an image or other non-text data.

At 460, if the query result comprises a non-text resource, a link to the resource is generated, and interpolated into a display of the computer text input to replace the first portion. In this example, the second portion of the entered text may not be replaced.

At 470, if the query result does not comprise a non-text resource, the query result is interpolated into a display of the computer text input to replace the first portion. In this example, the second portion of the entered text may not be replaced.

Figure 5:
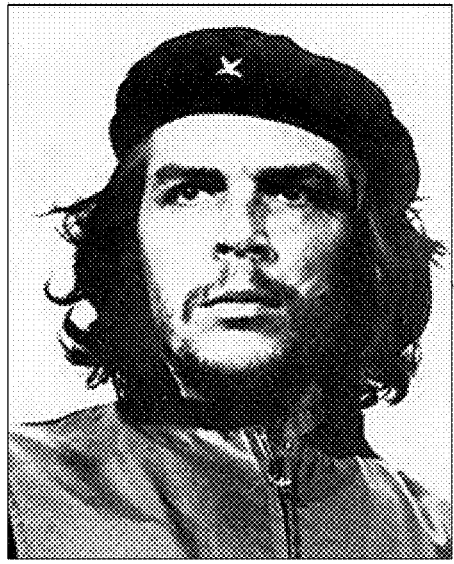
FIG. 5 is another example of computer text input boxes before and after a query returning non-text input is interpolated into the computer text input.

FIG. 5 illustrates another example of how a user's query for data can be input directly into a text input area, and the results interpolated directly into the text where the query was entered. In this example, rather than entering a query that is likely to result in interpolation of a text result into the entered computer text, the user has instead entered a query that is likely to return a non-text result for interpolation. In the illustrated example, the particular query result is an image, although it is understood that other non-text results, such as videos, web pages, URLs, or other non-text results may also be returned.

As shown in the illustrated example 500, the user types: "Hey have you seen this image? {{Che Guevara famous photo URL}}" in a first text box 510. In the illustrated embodiment, the portion of this phrase {{Che Guevara famous photo URL}} might be interpreted as a query, which in turn may run, e.g., against a database that contains URLs to websites containing images of famous individuals. Thus, rather than returning the actual image, the query may return the URL for the website where a famous image of Che Guevara is located, namely: "upload.wikimedia.org/wikipedia/commons/thumb/5/58/CheHigh.jpg/225px-CheHigh-.jpg". As with the text results discussed above, this URL may be returned, and subsequently interpolated into the text entry box, as shown in second text box 520. In some embodiments, the URL may simply be returned as plain computer text. In other embodiments, instead of returning plain computer text a "hyperlink" may be provided along with the text result. In this way, as illustrated in third text box 530, the user receiving the message may be able to clock on the hyperlinked text, and in turn open a new window 540 for a website corresponding to the returned URL where the image 550 is located. In some embodiments, this new window 540 may include a Close button 560 (or another user input means, such as those described above) allowing the user to close the new window and return to the original third text box 530 corresponding to the received message.

Figure 6:
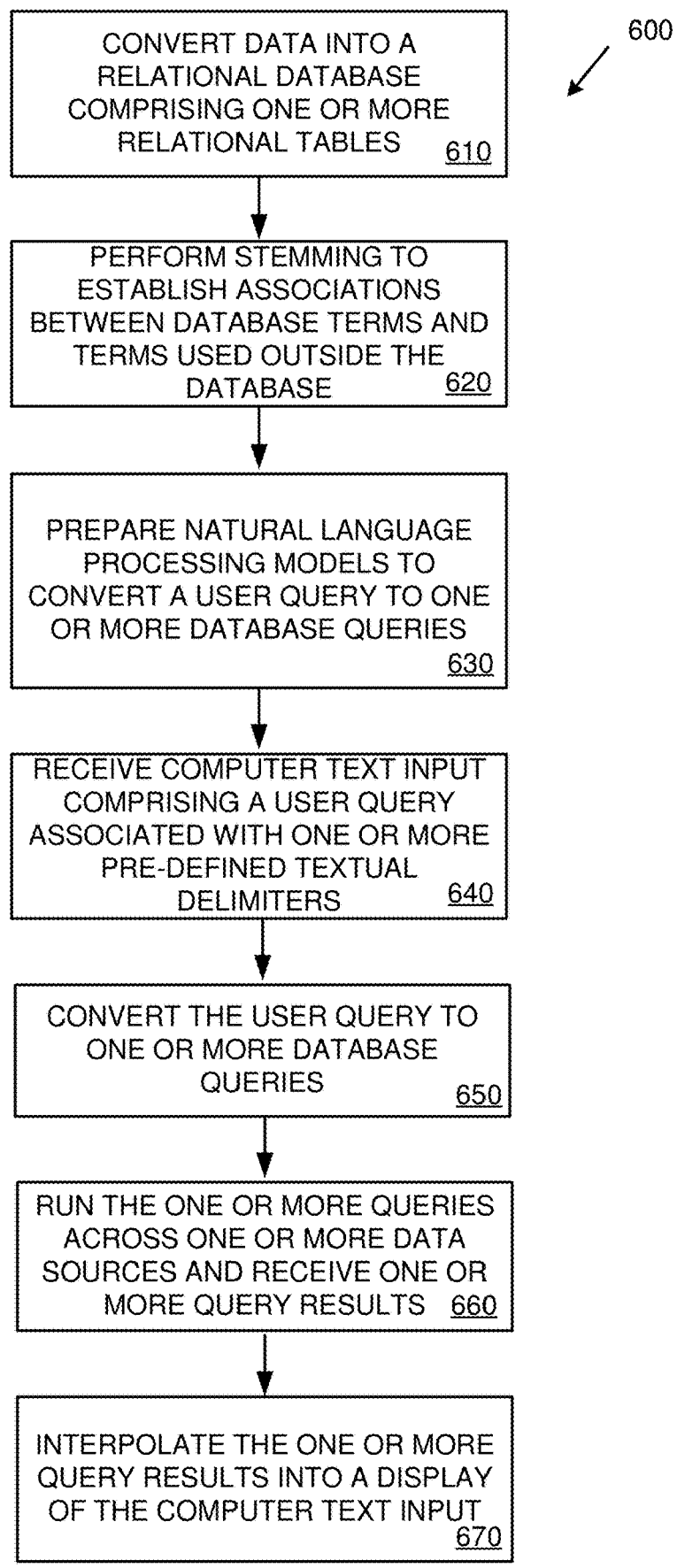
FIG. 6 is a flowchart of another example method for interpolating a query in computer text input.

FIG. 6 is a flowchart of an exemplary process 600 for preparing data tables which may be usable with the techniques of this disclosure. It is to be understood that not all steps may be performed, or that certain steps may be performed in a different order than set forth herein.

At 610, a plurality of data items are converted into a relational database comprising one or more relational tables. For example, various pieces of data regarding a given subject (or many unrelated subjects) may already be stored in one or more data stores. These data stores may be available locally on a user's device, on a local network to which a user has access, or on a broader network, such as the World Wide Web. One example of such a data store would be the Microsoft® Satori knowledge repository, but it is to be understood that many such repositories exist. However, in some instances the organization of this data stored in a given knowledge repository may not be amenable to statistical querying in its native state. So, data items related to a given subject, such as the sport of cricket may be rearranged into one or more tables that contain related data, as illustrated below.

For example, a knowledge repository such as Satori may contain a number of items of information about various aspects of a given topic, such as the sport of cricket. In the cricket context, some examples of this information might include: 1) information about tournaments, 2) match scorecards, 3) player batting records, 4) grounds (or locations where a cricket match may have been played), 5) cities, 6) countries, 7) continents, 8) modes of dismissal (how a given cricket batsman was dismissed from the game, or "bowled out"), and 9) cricketeers (names of players). It is understood that these are merely examples, and that additional data, or different data could be stored about a given subject. In certain embodiments, this data may be converted from a native form that does not provide relationships between given pieces of data, and, e.g., a relational database arrangement, where related data pieces are set forth. One such exemplary set of tables is set forth below. Thus, in order to find out a given piece of data in response to a user request, queries can be run against these databases to return a concrete result, such as, e.g., how many runs Sachin Tendulkar scored in the 1996 World Cup. An exemplary database schema of relational tables may look like something like this:

TABLE 1

Cricket_Tournaments

| Id | Name | Year |
|---|---|---|
| 123421 | Wills World Cup | 1996 |
| 34519 | Pepsi Cup | 1998 |
| 48123 | Independence Cup | 1998 |
| ... | ... | ... |

TABLE 2

Cricket_Match_Scorecards

| Id | Tournament | Date | Scorecard | Ground | Country1 | Country2 |
|---|---|---|---|---|---|---|
| 689 | 123421 | Jan. 11, 1996 | <link to Cricinfo page for scorecard> | 2345 | 899 | 234 |
| 34519 | 123421 | Mar. 11, 1996 | <link to Cricinfo page for scorecard> | 5431 | 456 | 157 |
| 48123 | 123421 | Jul. 11, 1996 | <link to Cricinfo page for scorecard> | 1278 | 321 | 229 |
| ... | ... | ... | ... | ... | ... | ... |

TABLE 3

Player_Batting_Records

| Player | Match | Runs | Dismissed_By | Mode_of_Dismissal |
|---|---|---|---|---|
| 2356 | 689 | 121 | — | — |
| 3491 | 23 | 67 | 12 | 3 |
| 2356 | 129 | 45 | 23 | 1 |
| ... | ... | ... | ... | ... |

TABLE 4

Grounds

| Id | Name | City |
|---|---|---|
| 2345 | Eden Gardens | 123 |
| 5431 | Gabba | 456 |
| ... | ... | ... |

TABLE 5

Cities

| Id | Name | Country |
|---|---|---|
| 456 | Brisbane | 899 |
| 123 | Kolkata | 234 |
| ... | ... | ... |

TABLE 6

Countries

| Id | Name | Continent |
|---|---|---|
| 899 | Australia | 4 |
| 234 | India | 2 |
| ... | ... | ... |

TABLE 7

Continents

| Id | Name |
|---|---|
| 4 | Australia |
| 2 | Asia |
| ... | ... |

TABLE 8

Modes_Of_Dismissal

| Id | Mode |
|---|---|
| 1 | Bowled |
| 3 | LBW |
| ... | ... |

TABLE 9

Cricketers

| Id | Name | CityOfBirth | DateOfBirth |
|---|---|---|---|
| 2356 | Sachin Tendulkar | 234 | Apr. 24, 1973 |
| 1239 | Vinod Kambli | 234 | Sep. 11, 1970 |
| ... | ... | ... | ... |

At 620, associations may be made between terms used in the database and similar terms that are not used in the database, but may be used, e.g., in common parlance. In this way, terms used in common parlance which may not be identical to the terms used in a given common database may nonetheless be used in a given query. This may include a non-trivial amount of stemming of words, or finding multiple words or phrases that may be used to refer to the same thing. For example, in the above table Modes_Of_Dismissal, one "Mode" is listed as "LBW", which is not a valid English word. LBW actually stands for "Leg Before Wicket", and although the use of "leg before wicket" is infrequent in common parlance, people do use that phrase as well, as in: "The leg before wicket was devastating to his confidence", etc. So, in common parlance, people may use LBW in their conversations: "It was clean LBW, umpire erred", or they may even change its form—"He was plump LBWed, but saved by the grace of the umpire". It is desirable, then, that each of these multiple different related terms that are used to refer to a specific term can be recognized, so that if in a query, e.g., a user seeks information about a "Leg before Wicket", the instrumentality handling the query will return the appropriate result, namely the information relating to what is identified in the table as "LBW." As another example, in the game of cricket, people often refer to scores between 100 and 199 as hundreds, centuries, or tons, scores between 200-299 as double hundreds, double centuries or double tons, and scores between 300-399 as triple centuries or triple hundreds. Hence it may be desirable to map a commonly used term, such as "double hundred" to a subquery, e.g., from Player_Batting_Records where runs >=200 and runs <=299". This is a fairly straightforward operation to perform, so long as the proper associations have been made. And, there may be indexes available that can be leveraged to provide some of these associations, such as Bing® index data.

At 630, natural language processing (NLP) models may be prepared based on a relationship between and among named entities, in order to convert user queries (e.g., natural language queries) into database queries. For example, using the above database schema, to find out a list of centuries made by Sachin Tendulkar (player id 2356) in Australia (country id 899), one might construct a complete query with a series of subqueries in relational database language, such as structured query language (SQL):

select runs from Player_Batting_Records inner join Cricket_Match_Scorecards where score>=100 and player=2356 and ground in (select grounds.id from grounds inner join cities inner join countries where countries name="Australia")

In an ideal case, if a user submits a query like this, it can be run against a database comprising the tables set forth above, and this query is likely to return the appropriate result. However, most users are unlikely to be familiar with this SQL language, and are instead more likely to use common parlance for their query. So, a user might type something like, for example: "Tendulkar's centuries in Australia", or "Hundreds by Tendulkar in Australia". If a user is interested in seeing scorecards for Tendulkar's best matches in Australia, she might type: "Scorecards of Tendulkar's tons down under". Thus, to be effective, NLP models may be designed by parsing a considerable (though finite) amount of data regarding means of, and relationships between commonly used terms. For example, terms like against, versus, etc. are to be lumped together as relating to a match versus a given opponent.

Similarly, common catchphrases may be mapped to correct terminology based on, e.g., "part of speech" tagging. For example, while in the phrase "centuries against Kiwis", it is most likely that Kiwi refers to teams from New Zealand, conversely in the phrase "a cool fluffy Kiwi", it is likely that the user is referring to the actual bird. The phrase "centuries down under" might be used to refer to 100 run matches in Australia, whereas "I was hurt down under" may possibly mean that the speaker was struck by a cricket bat (whether situated in Australia or not). As another example, "matches against the Proteas" may likely refer to matches versus South Africa, whereas "Protean batsman" may refer to a skilled, dexterous batsman. Also, seemingly minor words in a phrase may play a large importance in interpreting, e.g., user input as a query. For example, "centuries in Australia" likely means centuries scored while playing a match in Australia, so in the resulting subquery, the clause should be something like: "where ground is in Australia", whereas "centuries vs Australia" likely refers to centuries made against an Australian team, regardless of the ground on which the match was played. Indeed, the match could occur anywhere in the world. In that case, the subquery might be something like: "where country=Australia".

Most common usages involving data that has a finite number of potential results can be converted to a query as described herein, or into a series of subqueries. Of course, the usage can be more complex than the examples above, and may involve, e.g., statistics, as well, for example, where a user might query: "scorecards of centuries made by Tendulkar where Ganguly was the captain and Mcgrath was playing and India batted second and no other batsmen from India reached 30". Queries like this can be broken into multiple parts, separated by delimiters like "and", which can be understood within the query to yield a specific result that may be the combination of subqueries. Here, combining the various parts of the initial query may yield "Ganguly was captain", "Mcgrath was playing", "India batted second", "No other batsmen from India reached 30". If information from the scorecard is also stored in another table or tables, these queries are easy to combine and search.

Again, as discussed above, context may be important in helping to parse these queries. As for the terms Tendulkar and century in the above query "Scorecards of centuries made by Tendulkar in Australia" may be easily understood from the context of a discussion about cricket, while it might not be as well understood outside that context, or it may be understood with what is a conventional meaning outside of the cricket context, namely a span of 100 years, as in "in the $19^{th}$ century". Similarly, in a discussion about cricket, there may be only one individual of note names Tendulkar, while there may be many other famous persons named Tendulkar in other contexts. So, just like an existing entity recognition algorithm, such as the Bing® algorithm at www.microsoft-.com/cognitive-services/en-us/entity-linking-intelligence-service may find related entities and tag them appropriately, here context provides clues that while two separate terms taken individually may mean many things, combined together, they may have a recognizable and specific meaning. Sachin Tendulkar likely refers to a player who plays cricket, and a century by Tendulkar likely means a score of 100 or more runs in a cricket match. And, as discussed above, "in Australia" may translate to a query like "where ground is in Australia". Combined, a user query of "Tendulkar's centuries in Australia" may yield a database query like:

"select runs, scorecard from Player_Batting_Records inner join Cricket_Match_Scorecards inner join Cricketers where score >=100 and name="Sachin Tendulkar" and ground in (select grounds.id from grounds inner join cities inner join countries where countries name="Australia")"

Assuming Tendulkar has scored multiple centuries in Australia, this user query would be expected to return multiple results, as would a typical database query.

At 640, computer text input is received, which includes a user query that is associated with one or more pre-defined textual delimiters. In exemplary embodiments, a backend service may be established that receives user queries in a specified format, such as JSON. It is to be understood that another similar format may be used. A typical set of JSON queries may look like this:

```
[
    {
        "Tendulkar's centuries in Australia"
    },
    {
        "Scorecard of Tendulkar's centuries in Perth in 1994"
    },
    {
        "Video of Ganguly's 144 in Brisbane"
    },
    {
        "Scorecard of Lara's 153 in 1999"
    }
]
```

It is preferable that related queries be received, as it may be more difficult to parse inquiries on related subjects. For example, in the above, Ganguly, Lara, and Tendulkar are all cricketing entities, so it will be easier to use context clues to parse their meaning. On the other hand, if the queries are varied, e.g., a first query refers to Tendulkar, a second query refers to John Lennon, and a third to Mahatma Gandhi, then it may be more difficult to return a reasonable result for all queries. This could lead the query to fail, at which point the user might be prompted to re-enter a different query, or to remove portions of a query, until a result can be returned.

Prior to receiving the user query, it is important that textual delimiters be established which differentiate the portion of the computer text input comprising the query from the surrounding text. For example, a custom markup format may be defined in which a first tilde (~) signals the beginning of a user query and a second tilde signals the end of the query. So, if a user types computer text input such as "I went to ~places I went to in Spain last year~" this would be interpreted as requesting a query result for "places I went to in Spain last year". Alternatively, different symbols can be used as textual delimiters, so long as they are defined prior to the time that the conversion action is to be performed on the data in the text box, and can thus be understood as seeking a query for the text associated with the pre-defined delimiters. Or, different symbols could be used depending on the context. For example, tildes might be used in a browser, such as the Microsoft Edge® browser, while brackets ({} and {}) might be used in a different context, such as an email program, such as Outlook®. And, while in the example the text to be queried is shown as being situated between textual delimiters, other pre-defined formats could be established, such as a first delimiter signifying a first query, and a second delimiter establishing a second query. Other arrangements of textual delimiters may be used, as well. In some embodiments, a user may be able to select which markup format she wants to use to define queries, such as by selecting from a drop down list of potential textual delimiters.

At 650, the user query (or multiple such queries) is converted into one or more database queries. In some embodiments, this may occur automatically once delimited text has been entered, while in other cases, the user may be prompted before this operation takes placesuch as by adding an additional option in a context menu, e.g., an "Interpolate" button, or other trigger. So, in an example where a user has typed in some computer text containing one or more desired queries associated with tilde textual delimiters, it might look like this:

Yes, I agree Tendulkar fared poorly in South Africa, but if you look at these—~scorecards of his centuries in Australia~, you will find that he did brilliantly against the best bowling attack of his times. Sure, Ganguly's 144—~video of Ganguly's 144 against Australia~ is also a class act, but yes, none can possibly match the grit and class of Lara in his 153—~scorecard of Lara's 153 against Australia~.

If user now elects (or the system is automatically programmed) to perform interpolation, either the entire text block, or in some instances simply the text associated with the textual delimiters may be passed to the backend query processor for conversion into one or more database queries. For example, in a particular embodiment, the text may be handed off to Bing® Linguistics API, which may replace one or more pronouns with proper names. In this instance, the above query would become:

Yes, I agree Tendulkar fared poorly in South Africa, but if you look at these—~scorecards of Tendulkar's centuries in Australia~, you will find that he did brilliantly against the best bowling attack of his times. Sure, Ganguly's 144—~video of Ganguly's 144 against Australia~ is also a class act, but yes, none can possibly match the grit and class of Lara in his 153—~scorecard of Lara's 153 against Australia~.

(Note that "his" has been replaced with "Tendulkar's"). Through further processing, such as stemming rules or other context tools, this query may be further converted so that it can be run on an underlying database. For example, in a particular embodiment, the query may be handed off to Bing® Entity Linking API, which may further identify the correct full names of the individuals identified in the user's query. In this instance, it is likely that Tendulkar actually refers to Sachin Tendulkar, that Ganguly refers to Sourav Ganguly, and that Lara refers to Brian Lara. It is important that the converted query is understood by the databases against it will be run, so stemming can further be performed to ensure that the result of converting a query to seek information about Sachin Tendulkar is not run against a database that refers to this individual as Sachin Ramesh Tendulkar. Once the query is parsed properly, it can be handed over to be broken down, as needed, to form one or more SQL queries, so:

~scorecards of Tendulkar's centuries in Australia~:
may become:
Where name="Sachin Tendulkar"
Where ground in (select grounds.id from grounds inner join cities inner join countries where countries name="Australia");
Where runs >=100;

Combined, the query may become:

"select scorecard from Player_Batting_Records inner join Cricket_Match_Scorecards inner join Cricketers where score >=100 and name="Sachin Tendulkar" and ground in (select grounds.id from grounds inner join cities inner join countries where countries name="Australia");"

This query, for example, may yield 10 URLs, each one pointing to a webpage where the scorecard for a different match is available, such as: www.espncricinfo.com/ci/engine/current/match/63567.html.

If present, as in the example above, additional queries may also be parsed and broken broken down. In the above example, a given query may not turn out to require a search of underlying databases, but may instead trigger a simple web search. So, in parsing "~video of Ganguly's 144 against Australia~" this query may be interpreted in such a way as to institute a web search, such as using Bing® Search APIs, which may return, for example, a YouTube® video of a match where Sourav Ganguly scored 144 runs: www.youtube.com/watch?v=Qvca6v55t54.

At 660, the one or more queries are run across one or more data sources, which may include, for example one or more of the data sources described above, such as relational databases, web search engines, or operating system data stores on a user's own computer. When, for example, the above three queries are all converted and run against their respective related data sources, the return response may look like this:

```
{
    "1":    ["http://www.espncricinfo.com/ci/engine/current/match/63567.html",
            "http://www.espncricinfo.com/ci/engine/current/match/63565.html",
            "http://www.espncricinfo.com/ci/engine/current/match/63866.html",
            . . .
            ],
    "2":    "https://www.youtube.com/watch?v=Qvca6v55t54",
    "3":    "http://www.espncricinfo.com/ci/engine/current/match/63839.html"
}
```

This query results may then be received back at the source of the computer text input from which the query was originally generated. For example, the data may be received back at a source application, such as a browser.

At 670, the results of the one or more queries are interpolated back into a display of the computer text input from which they were drawn. For example, the source application in which the computer text input was received may be further configured to parse the one or more query results in sequence, and to interpolate each of these results in the appropriate location. For example, in the above example, the first query result would be interpolated back to the location of the first tilde-enclosed string (e.g., the computer text input between the first pair of tildes), the second query result between would be interpolated back to the location of the second tilde-enclosed string, and the third query result back to the location of the third tilde-enclosed string. In the example illustrated above, the query results are comma separated and joined, so that the result preceding each comma is placed into its respective location within the original computer text input. So, in the above example, the user's original statement:

Yes, I agree Tendulkar fared poorly in South Africa, but if you look at these—~scorecards of his centuries in Australia~, you will find that he did brilliantly against the best bowling attack of his times. Sure, Ganguly's 144—~video of Ganguly's 144 against Australia~ is also a class act, but yes, none can possibly match the grit and class of Lara in his 153—~scorecard of Lara's 153 against Australia~.

May now become:

Yes, I agree Tendulkar fared poorly in South Africa, but if you look at these—Scorecard1, Scorecard2, Scorecard3, you will find that he did brilliantly against the best bowling attack of his times. Sure, Ganguly's 144—Video is also a class act, but yes, none can possibly match the grit and class of Lara in his 153—scorecard.

In the above example, each underlined item may comprise a pointer to a hyperlink that may underly the scorecard. In some embodiments, clicking on the hyperlink(s) would take, e.g., a user receiving the message to the respective locations represented thereby. For example, for the scorecard links, the user might be taken to a website where each such scorecard is stored. Or, in the case of the video link, the user might be taken to a location where the video may be seen, such as a YouTube® channel So, the techniques described herein permit the user to address a number of problems inherent with trying to insert information from multiple locations outside an application into a text box within the application.

First, previously, a user would have had to do multiple searches in a search engine, collect the URLs (or other search results), and paste them separately back into the source application, such as a browser window, or a Skype text box, and send it to his friend. With the techniques described herein, the user is able to remain in the original application, e.g., Skype the entire time, her query results may be "interpolated" in place, and the original text may be modified as needed to contain the new data. This process of interpolation may be similar to the process used in other programming languages, where, e.g., the command printf ("My value is % f",a) might—if a is =1.1—print "My value is 1.1", interpolating a's value into the printed string.

Second, this also solves problems associated with gathering data that may be unique to the user whose input is being queried. For example, in the example above of the user who had visited many places in Spain, she is likely to have taken photos at each place on her trip. These photos may be saved, e.g., to the user's photo album, which may allow a search on the user's computer to query images taken by the identifying data associated therewith, such as the place or time where the photo was taken. So when an application configured for use with the techniques described herein detects a query like ~Places I visited in Spain last year~, the presence of contextual terms like "I", "Me", "We", etc. can provide the contextual clues necessary to indicate that the query should be run not against a global resource, such as the World Wide Web, or on some knowledge databases that contain, e.g., statistical information about a sporting event, but rather should trigger a query of personalized data, such as, for example, performing intra-operating system (OS) query interpolation like "select cities from user_visited where year=2017 and country='Spain'", where user_visited may be a user-specific table tracking all places a user has visited, such as by date and location of places where a user has saved images. Using the query results, the interpolation techniques described herein can expand the names of all those query results inline, without the user having to remember and type them. So, for the user described above who visited eight specific cities in Spain last year, "I visited ~places I visited in Spain last year~.", after interpolation, may becomes "I visited Seville, Mallorca, Barcelona, Madrid, Malaga, Marbella, Granada and Cordoba."

Additionally, in some particular embodiments, after a user has entered the computer text, she may be prompted to interpolate the query, as described above. In other embodiments, interpolation might happen automatically. In still other particular embodiments, the user may be prompted again after interpolation has been performed to provide an indication whether the results are accepted or not. Such a prompt may provide the user an opportunity to revert, e.g., to the pre-interpolated text in a case where the query results are not as desired or expected.

In other implementations, other techniques can be employed to interpolate query results into computer text input using textual delimiters.

Computing Systems

Figure 7:
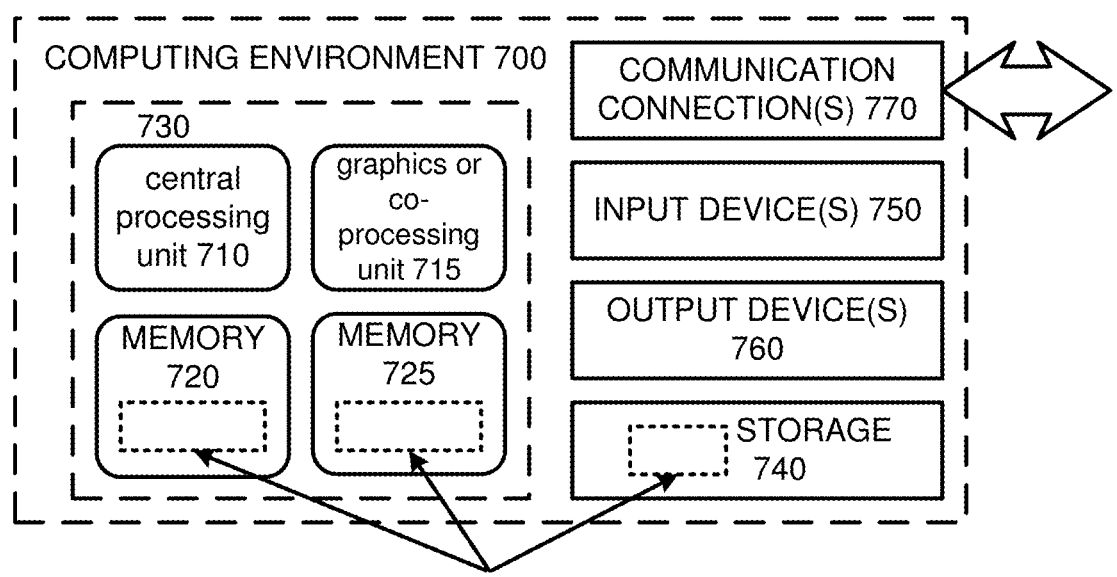
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
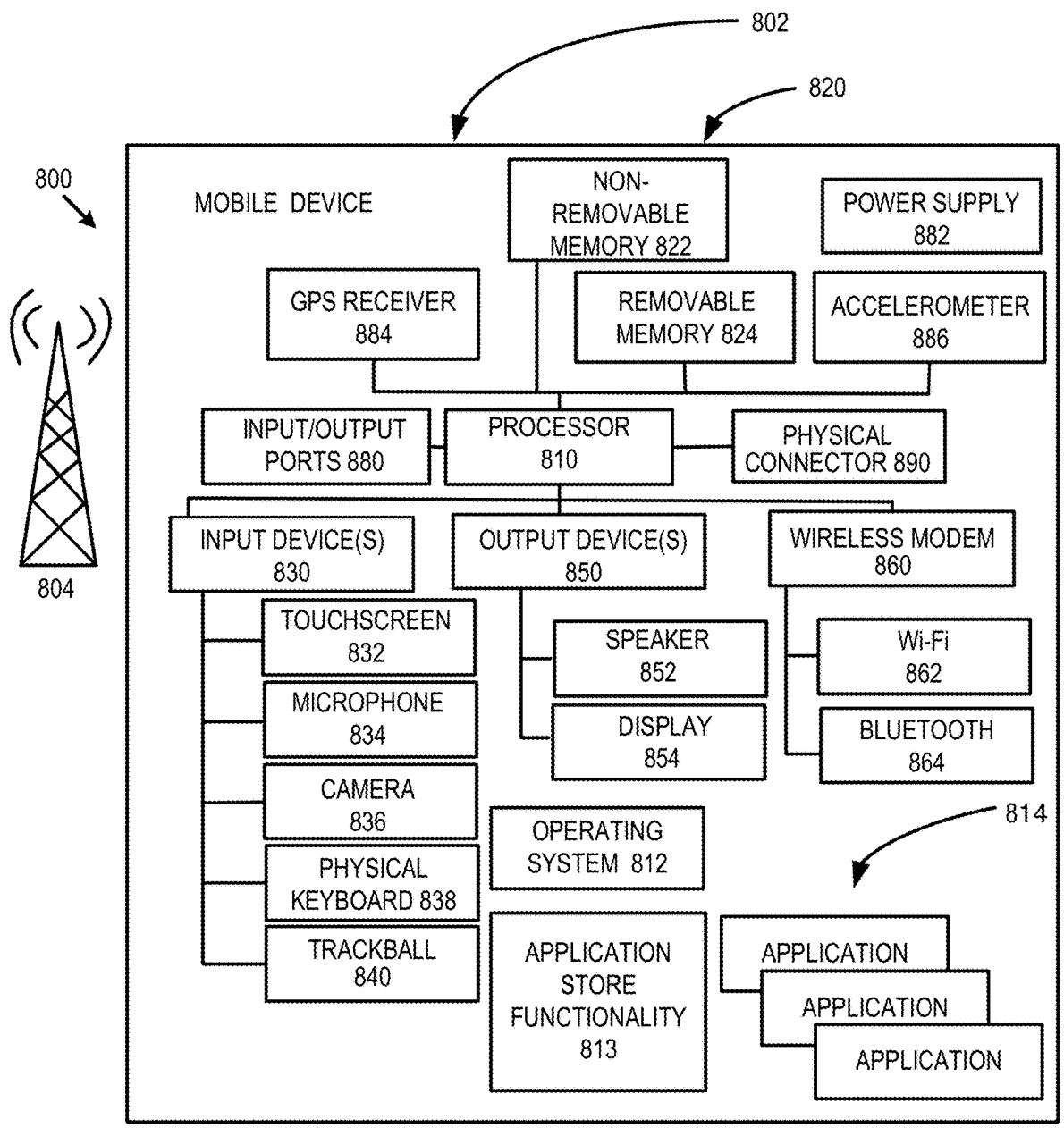
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Cloud-Supported Environment

Figure 9:
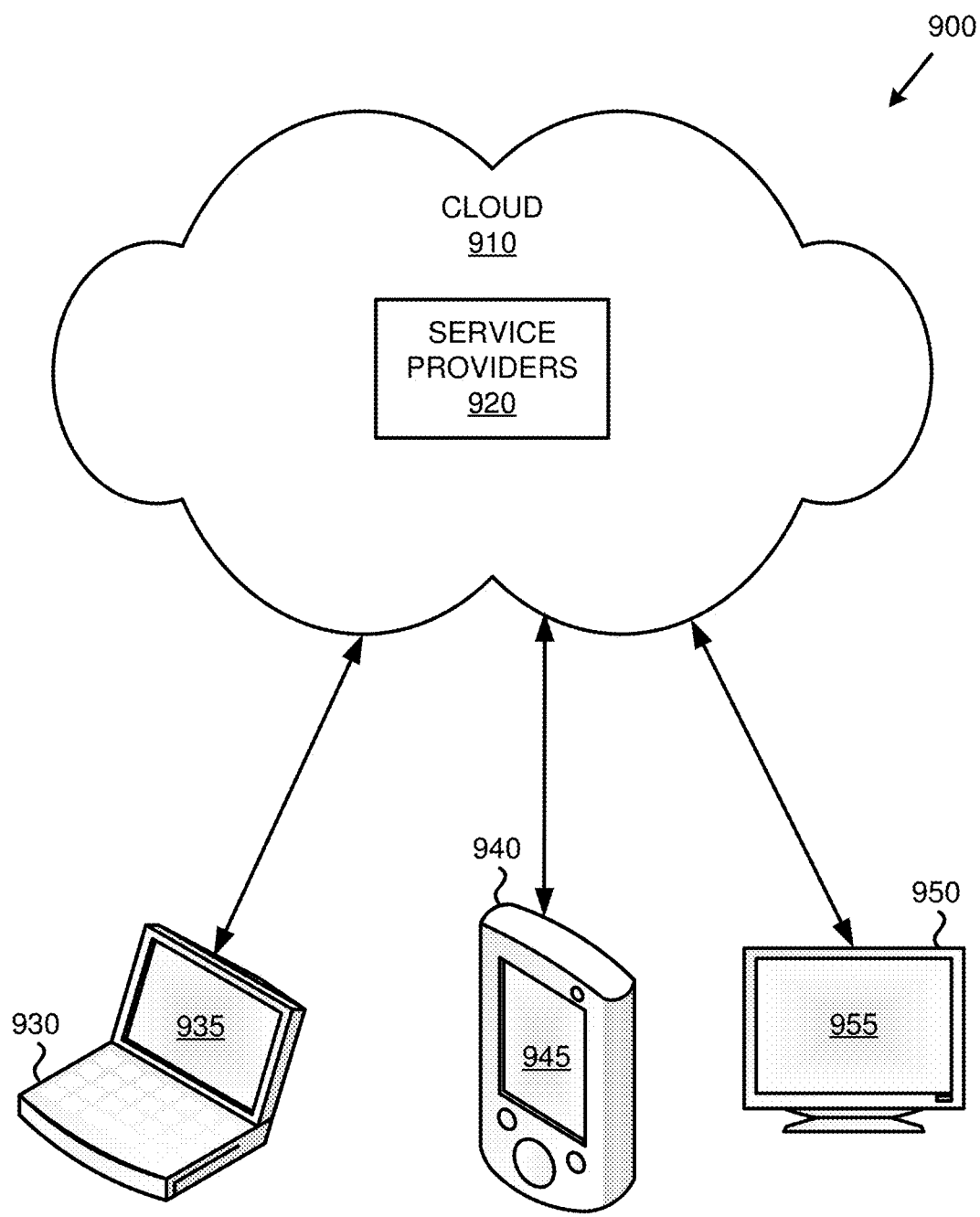
FIG. 9 is an example cloud-support environment that can be used in conjunction with the technologies described herein.

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens.

Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. By way of example and with reference to FIG. 8, computer-readable storage media include memory and storage 820, 822, and 824. The term computer-readable storage media does not include signals and carrier waves. In addition, the term computer-readable storage media does not include communication connections, such as 770, 860, 862, and 864.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the invention is defined by the following claims. We therefore claim as our invention all that comes within the scope and spirit of these claims.

I claim:

1. A computer-readable storage medium storing computer-executable instructions for execution on a computing device to perform operations for interpolating queries into computer text input, the operations comprising:
   receiving computer text input from a user, the computer text input comprising:
      a first portion of the computer text input that begins with a first delimiter and ends with a second delimiter and further comprises additional computer text input between the first and second delimiters, wherein the first portion represents a natural language query; and
      a second portion of the computer text input that is outside of the first and second delimiters;
   interpreting the first portion of the computer text input into a query;
   running the query across one or more data stores and receiving a query result;
   determining that the query result comprises a non-text resource, and based on the query result comprising a non-text resource, generating a link to the non-text resource; and interpolating the query result into a display of the computer text input to replace the first portion of the computer text input, wherein interpolating the query results comprises:
    deleting the first portion of the computer text input, wherein the second portion of the computer text input is not deleted; and
    replacing the deleted computer text input with the query result, wherein when the query result comprises a non-text resource:
        the replacing comprises inserting the link to the non-text resource, and
        the non-text resource itself is not included in the replaced computer text input.

2. The computer-readable storage medium of claim 1, wherein the operations are performed without the user having to navigate away from a text input box in which the computer text input is received.

3. The computer-readable storage medium of claim 1, the operations further comprising performing the interpreting operation without prompting a user for further input.

4. The computer-readable storage medium of claim 1, the operations further comprising after performing the interpolating, prompting a user whether the user wishes to accept the interpolation, or revert back to the replaced computer text input.

5. The computer-readable storage medium of claim 1, the operations further comprising, prior to receiving the computer text input, receiving a user selection of textual delimiters that will be recognized in the computer text input.

6. A computing device comprising:
    a processing unit; and
    memory;
    the computing device configured via computer-executable instructions, to perform operations for interpolating a query into computer text input, the operations comprising:
        receiving computer text input from a user comprising one or more textual delimiters;
        interpreting the computer text input into a query;
        running the query across one or more data stores and receiving a query result, the query result including a non-text resource; and
        based on the query result including the non-text resource, generating a link to the non-text resource and interpolating the query result into a display of the computer text input to replace one or more portions of the computer text input that are associated with the one or more textual delimiters, wherein interpolating the query result into the display includes replacing the one or more portions of the computer text input with the generated link to the non-text resource without including the non-text resource itself in place of the replaced one or more portions of the computer text input.

7. The computing device of claim 6 wherein the one or more textual delimiters comprise a first delimiter representing the beginning of the query, and a second delimiter representing the end of the query.

8. The computing device of claim 7, wherein the first delimiter and the second delimiter use a same character or characters.

9. The computing device of claim 7, wherein interpolating the query results comprises:
    deleting the first delimiter, the second delimiter, and any computer text input positioned in between the delimiters; and
    replacing the deleted delimiters and text input with the link to the non-text resource.

10. The computing device of claim 6 wherein the operations further comprise:
    providing a menu or icon for the user to request that the computing device interpret the computer text input into a query;
    receiving the user request; and,
    performing the interpreting after receiving the user request.

11. The computing device of claim 6, wherein the query result comprises an image or a video file.

12. The computing device of claim 6, wherein the one or more data stores comprises one or more of a local store on the computing device, a network store on a distributed network accessible to the computing device.

13. A method, implemented by a computing device, for interpolating a query into computer text input, the method comprising:
    receiving computer text input from a user comprising one or more textual delimiters;
    interpreting the computer text input into a query;
    running the query across one or more data stores and receiving a query result, the query result including a non-text resource; and
    based on the query result including the non-text resource, generating a link to the non-text resource and interpolating the query result into a display of the computer text input to replace one or more portions of the computer text input that are associated with the one or more textual delimiters, wherein interpolating the query result into the display includes replacing the one or more portions of the computer text input with the generated link to the non-text resource without including the non-text resource itself in place of the replaced one or more portions of the computer text input.

14. The method of claim 13, wherein the one or more textual delimiters comprise a first delimiter representing the beginning of the query, and a second delimiter representing the end of the query, and further wherein interpolating the query results comprises:
    deleting the first delimiter, the second delimiter, and any computer text input positioned in between the delimiters; and
    replacing the deleted delimiters and input with the query result.

15. The method of claim 13, wherein the query is a Structured Query Language (SQL) query.

16. The method of claim 13, the method further comprising, prior to receiving the computer text input, receiving a user selection of textual delimiters that will be recognized in the computer text input.

17. The method of claim 13, the method further comprising:
    in response to receiving the computer text input from the user including the one or more textual delimiters, presenting a menu or icon permitting the user to confirm that the user wishes the computer text to be interpreted as a query; and
    in response to receiving the confirmation from the user, performing the interpreting the computer text input into a query.

18. The method of claim 13, wherein the computer text input further comprises computer text positioned outside the delimiters, as well as computer text positioned between the delimiters.

19. The method of claim 18, wherein the computer text positioned outside the delimiters is not replaced.

20. The method of claim 13, wherein the one or more data stores comprises one or more of a local store on the computing device, a network store on a distributed network accessible to the computing device.

\* \* \* \* \*